March 27, 1928. 1,663,801
J. KAUTZKY, JR
FREE SPOOL LEVEL WIND FISH REEL
Original Filed July 19, 1924
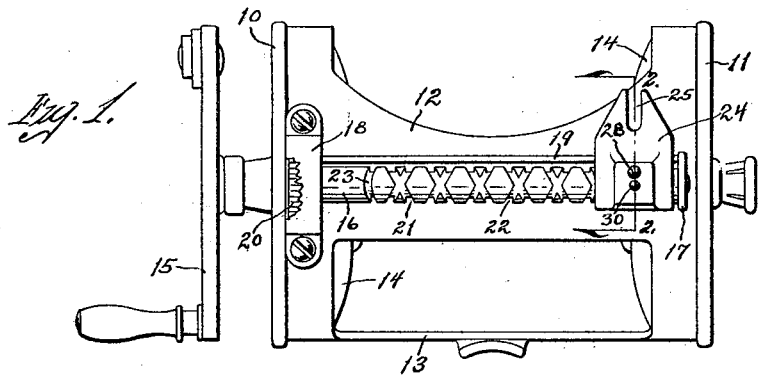
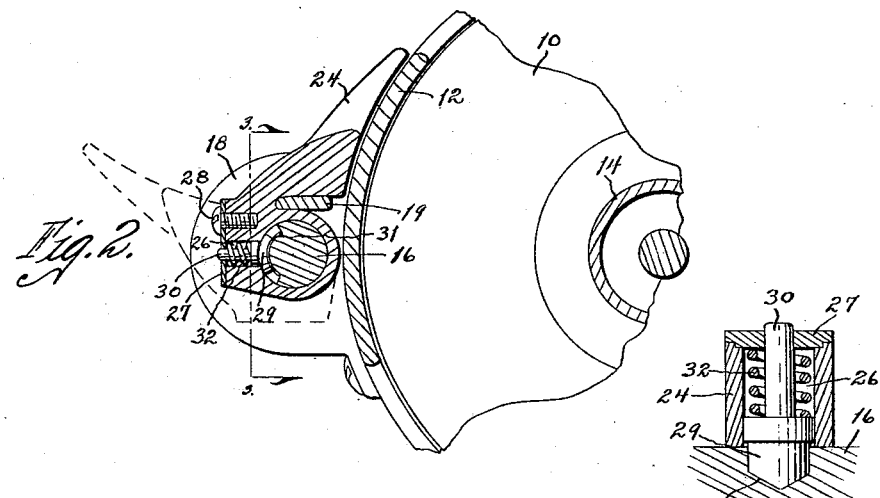
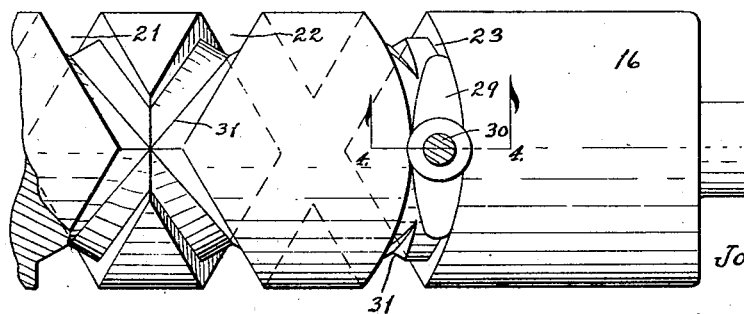
Inventor
JOE KAUTZKY Jr.
By Earl M. Sinclair
Attorney Patented Mar. 27, 1928.

1,663,801

UNITED STATES PATENT OFFICE.

JOE KAUTZKY, JR., OF FORT DODGE, IOWA.

FREE-SPOOL LEVEL-WIND FISH REEL.

Original application filed July 19, 1924, Serial No. 727,075. Divided and this application filed May 1, 1926. Serial No. 105,980.

The subject matter of this application was originally included in but has been divided from my application filed July 19, 1924, Serial Number 727,075.

The principal object of the present invention is to provide improved means in the traversing mechanism of a fish reel to insure proper laying of the line on the reel in the winding-in operation.

More specifically, the object is to prevent, or minimize, the tendency at times of the line to pile up at one point on the spool, particularly during the interim between the initiation of the winding-in operation and the time when the line is engaged by the level-wind carriage.

A further object is to provide a forward cross-bar for the reel which is formed with a concaved upper margin whereby an unguided line tends to travel toward the center of the frame because of a decided decline from either end to the center of the cross-bar and piling up of the unguided line at either end of the spool is prevented.

A further object is to provide an improved construction for a traversing carriage of a level-wind reel.

Another object of this invention is to provide an improvement in level-wind reels in which the line carriage pawl is shaped to fit and conform to a V-shaped groove on the line carriage shaft and is thereby guided in its travel along said groove, thereby eliminating the tendency of said pawl to catch on a point and lock the device.

With these and other objects in view, my invention consists in the construction, arrangement and combination of elements hereinafter set forth, pointed out in the claims and illustrated by the accompanying drawing, in which—

Figure 1 is a front elevation of a free-spool level-wind reel constructed according to my invention. Figure 2 is a detail section, on an enlarged scale, on the line 2—2 of Figure 1. Figure 3 is a fragmentary elevation showing a portion of the doubly-spiral-grooved line carriage shaft and pawl adapted for travel therein, which may be used in connection with my reel. Figure 4 is a detail section, on an enlarged scale, on the line 4—4 of Figure 3.

In the construction of the device as shown a skeleton cylindrical frame is provided, consisting primarily of spaced disks or head plates 10 and 11 connected by cross-bars 12 and 13, other parts being employed which have nothing to do with the present invention and are shown more or less conventionally. A spool 14 is suitably journaled for rotation within the skeleton frame and is adapted to receive a fishing line, not shown. A hand crank 15 is arranged for rotation adjacent the head plate 10, and suitable clutch connections (not shown) are provided whereby the reel 14 is rotated rearwardly when said crank is turned forwardly, in a common manner. One form of such mechanism is shown and described in my original application above referred to, and it also includes means for positively producing the release of the spool when winding force is removed from said crank, without reference to outward travel of the line from the spool, thus leaving the spool and line entirely free and unobstructed and producing no friction or drag in making a cast.

A carriage shaft 16 is arranged across the front of the device and journaled in a bearing 17 at one end and in a housing 18 at the opposite end, said bearing and housing being mounted on the cylindrical frame of the reel and being connected by a bar 19 extending longitudinally just above the shaft 16. There is also suitable gearing 20, located partly within the housing 18 and connected with the crank 15, whereby the shaft 16 is rotated to the rear when said crank is rotated in a forward direction. This mechanism also is of common form, and is shown and described in my parent application referred to. In the present instance the carriage shaft 16 is formed with oppositely inclined spiral grooves 21 and 22 in its periphery extending the major portion of the length of the shaft and communicating with each other at each end, said groove crossing each other at oblique angles at frequent intervals as shown. The communicating portions of the grooves 21 and 22 preferably are arranged on arcs and are shown at one end of the shaft in Figure 3 and designated by the numeral 23. A level-wind carriage 24 is mounted on the shaft 16 and is adapted for rotary oscillation thereon to a limited degree and also for travel longitudinally of the shaft, in a common manner. The carriage 24 is formed with a fork or notch 25 at its free end, which end projects upwardly when the carriage is in operative or winding position as shown in Figure 1 and by solid lines in Figure 2, with the fork or notch 25 projecting across the periphery of the arbor of the spool 14 and adapted to guide a line being wound thereon and lay said line in even or "level" windings on said spool, as said carriage travels longitudinally of the shaft 16 and in sliding contact with the bar 19. The carriage is also adapted to be oscillated forwardly on the shaft 16 to substantially horizontal position as indicated by dotted lines in Figure 2, which is the correct position for said carriage when the line is paying out from the spool as in the act of casting, so that said line is unobstructed by any contact with the carriage. The carriage 24 is formed on its normally forward side with a recess 26 opening to the bore by which said carriage is pivotally mounted on the shaft 16. The recess 26 is closed by means of a plate 27 held in place by a screw 28, and an elongated pawl 29 is mounted in said recess, enters one or another of the grooves 21, 22 or 23, and is formed with a stem 30 projecting through said plate 27. Rotation of the shaft 16 causes the pawl to be moved lengthwise of the inclined grooves 21 and 22 and arcuate grooves 23, so that the carriage is carried successively from one end to the other of said shaft as the pawl travels in the spiral grooves, and reverses its movement at each end of the shaft as the pawl passes through one or the other of the arcuate grooves 23 from one spiral groove to the other. When the notch or fork 25 of the carriage is in engagement with a line being wound upon the spool 14, such movement of the carriage causes the line to be laid in even or level layers on the spool. According to my improvement each of the spiral grooves 21 and 22 is formed at its bottom with a special track groove 31 which is angular, preferably substantially V-shaped in cross-section, and the lower face of the pawl 29 is formed to fit snugly within said angular groove as clearly shown in Figure 4, and is pressed into engagement therewith by means of a spring 32 wound on the stem 30 thereof and abutting the top of said pawl and the under surface of the plate 27. It is the function of the V-shaped spiral grooves, and the close fitting arrangement of the traveling pawl therein, to guide said pawl in its travel and cause it to continue in its proper course throughout the length of either of said spiral grooves and to overcome the tendency found in most devices of this character for the pawl, especially after the parts have become somewhat worn, to catch on one of the points caused or formed at the crossing of the spiral grooves and thus lock the carriage and prevent proper operation. The V-shaped portion of the grooves is omitted in the arcuate portions 23, thus permitting the pawl to turn through an arc in passing from one spiral groove to the other. In devices of this kind heretofore in use, dependence has been placed upon the outward movement of the line from the spool, as in making a cast, to carry the carriage forward to the position indicated by dotted lines in Figure 2, so that the line is freed from the notch or fork of said carriage. This necessarily caused some drag or hesitation in the travel of the line, and I have provided means for overcoming this difficulty. In my parent application above referred to there is a means for producing a backward snap action when winding force is released, for the release of the free-spool mechanism, which is also communicated to the shaft 16 by the gear 20. Pressure of the spring 32 also serves, in addition to the function hereinbefore mentioned, to produce a frictional contact between the shaft 16 and the carriage 24 so that said carriage is carried forwardly to releasing position when said shaft is snapped rearwardly, forward movement of said carriage being limited by contact of its base with the cross-bar 12. Similarly, the friction produced by the spring 32 acts to move said carriage rearwardly and upwardly to operative engagement with the line when the crank is turned to wind the line on the spool, the shaft 16 then being rotated to cause back and forth travel of the carriage as already indicated.

In the present invention I have provided means to prevent, or at least greatly reduce, the tendency at times of the line to pile up at one point on the spool, during the interim between the beginning of the winding operation and the time when the line is engaged by the carriage 24 and received within the notch itself. It sometimes occurs that the winding-in operation starts just as the carriage is beginning its return trip from that end of the spool near the head or disk 11 and the line is near that end, in which event it will be necessary, in case the line misses the notch 25, for the carriage to make a complete round trip before the line is engaged. Considering the manner in which these mechanisms are usually geared, this may mean that as many as twenty-two strands of the line will be laid on the spool near one end thereof, which is a very objectionable piling up and seriously interferes with the level-wind function. To partially overcome this I have shown the forward cross-bar 12 as formed with an arcuate upper margin as clearly shown in Figure 1, of concave form, so that the tendency of the line being wound in, when not engaged by the carriage, is to travel down the inclined or curved face of the bar toward the center of the spool, thus spreading the unguided winding of the line over approximately one-half the length of the spool, and also causing the carriage to pick up the line at about the middle of the spool rather than when it has returned to a point near the end.

To further overcome this objectionable tendency, I have made the carriage 24 considerably wider than is commonly done and formed the upper portions of its side margins on inclined lines, such lines extending at angles of substantially sixty degrees to the horizontal plane coincident with the lowest point of the curved surface of the bar 12. The carriage, being wider, engages the line more quickly and the line is forced up between the curved face of the bar 12 and the inclined face of the carriage, and caused to be level wound at an earlier point than otherwise would be. By this arrangement I can overcome, or at least minimize, the tendency of the unguided line to pile up on the spool. By making the end portions of the bar 12 higher than the end of the carriage, there is a tendency for the unguided line to drop into the notch 25 after it has been pushed to the end of the cross bar.

I claim as my invention—

1. In a fishing reel, a frame formed with cross-bars, the forward cross-bar having its upper margin concaved substantially throughout its length, whereby an unguided line engaging said bar at any point substantially removed from its center tends to travel toward the longitudinal center of the frame.

2. In a fishing reel, a frame formed with cross-bars, the forward cross-bar being formed with a concaved arcuate upper margin substantially from end to end, a line carriage mounted for reciprocation in front of the forward cross-bar, said carriage having its side margins converging toward its upper end.

3. In a fishing reel, a frame having a forward cross-bar formed with a concaved arcuate upper margin, a line carriage mounted for reciprocation in front of said cross-bar, said carriage having its side margins tapering upwardly on oblique angles from substantially the horizontal plane of the lowest point of said cross-bar, the end portions of said cross-bar rising materially above the upper end of said carriage.

4. In a fishing reel, a frame, winding mechanism, a carriage shaft journaled in said frame and connected with said winding mechanism, a level-wind carriage mounted for reciprocatory movement on said shaft, said shaft being formed with oppositely arranged spiral grooves, said grooves having portions which are substantially V-shaped in cross-section, a pawl pivotally mounted in said carriage and adapted to travel in said grooves, said pawl having its lower face substantially V-shaped in cross-section to engage in the V-shaped grooves and guide said pawl in its travel.

5. In a fishing reel, a frame, winding mechanism, a carriage shaft journaled in said frame and connected with said winding mechanism, a level-wind carriage mounted for reciprocatory movement on said shaft, said shaft being formed with oppositely arranged spiral grooves, said grooves having portions which are substantially V-shaped in cross-section, a pawl pivotally mounted in said carriage and adapted to travel in said groove, said pawl having its lower face substantially V-shaped in cross-section to engage in the V-shaped grooves and guide said pawl in its travel, and yielding pressure device engaging said pawl and holding it to a seat in said grooves.

6. In a fishing reel, a frame, winding mechanism, a carriage shaft journaled in said frame and connected with said winding mechanism, a level-wind carriage mounted for reciprocatory movement on said shaft, said shaft being formed with oppositely arranged spiral grooves connected at their ends by arcuate grooves, each of said spiral grooves being provided with an annular track groove at its bottom, and a pawl pivotally mounted in said carriage and adapted to travel in said grooves, said pawl having its bottom shaped to fit snugly in said track grooves, the track grooves being omitted in the connecting arcuate grooves to permit turning of said pawl.

7. In a fishing reel, a frame having a forward cross-bar formed with a concaved arcuate upper margin, a line carriage mounted for reciprocation in front of said cross-bar and having a notch in its upper end, the body of said carriage having a width at least twice as great as the width of said notch, the side margins of said carriage being formed on inclined lines in their upper portions and arranged at abrupt angles to a horizontal plane to substantially the outer end of said notch, whereby they engage an unguided line and start to distribute it evenly at an early point in the travel of said carriage.

8. In a fishing reel, a frame having a forward cross-bar which has its upper margin concaved substantially throughout its length, a line carriage mounted for reciprocation in front of said cross-bar, said carriage having its side margins tapering upwardly on oblique lines from substantially the horizontal plane of the lowest point of said cross-bar, the end portions of said cross-bar rising materially above the upper end of said carriage.

JOE KAUTZKY, Jr.